(12) United States Patent
Huang

(10) Patent No.: US 6,615,456 B1
(45) Date of Patent: Sep. 9, 2003

(54) PACKER

(76) Inventor: Chin-Sung Huang, No. 152, Cai Liao Rd., Pi Jiao Village, Pu Xin Shiang, Changhwa Hsien (TW)

( * ) Notice: Subject to any disclaimer, the term of this patent is extended or adjusted under 35 U.S.C. 154(b) by 0 days.

(21) Appl. No.: 10/102,637

(22) Filed: Mar. 22, 2002

(51) Int. Cl.[7] ............................................. A44B 11/02
(52) U.S. Cl. ........................ 24/68 CD; 24/68 E; 24/193
(58) Field of Search ........................... 24/68 R, 68 CD, 24/68 D, 68 E, 191, 193, 273

(56) References Cited

U.S. PATENT DOCUMENTS

| | | | | |
|---|---|---|---|---|
| 3,866,272 A | * | 2/1975 | Prete et al. | ............... 24/68 CD |
| 4,507,829 A | * | 4/1985 | Looker | ..................... 24/68 CD |
| 4,987,653 A | * | 1/1991 | Lin | ......................... 24/68 CD |
| 5,779,001 A | * | 7/1998 | Skyba | ......................... 182/107 |
| 6,158,092 A | * | 12/2000 | Huang | ..................... 24/68 CD |

FOREIGN PATENT DOCUMENTS

| | | | | |
|---|---|---|---|---|
| EP | 887226 A1 | * | 12/1998 | ............. B60P/7/08 |
| GB | 2119004 A | * | 11/1983 | ........... A44B/11/12 |
| GB | 2165880 A | * | 4/1986 | ........... A44B/11/02 |

* cited by examiner

Primary Examiner—James R. Brittain
(74) Attorney, Agent, or Firm—Alan D. Kamrath; Rider Bennett, LLP.

(57) ABSTRACT

A packer comprises a holder, a handle, a locking member, a spring, a pin and a pivot; wherein, the holder including a base plate guarded by two side panels, the handle including a seat guarded by two side plates, the locking member is a rectangular member extending a bit in the middle, the handle being pivoted between both side panels of the holder, the locking member and the spring being provided on a free end of the handle for easier fastening the tape onto an article.

2 Claims, 10 Drawing Sheets

PACKER

BACKGROUND OF THE INVENTION (a) Field of the Invention

The present invention relates a packer structure, and more particularly, to one that locks up and releases a tape with ease by operation of a pivoting mechanism with a holder.

(b) Description of the Prior Art

As illustrated in FIGS. 1 and 2 of the accompanying drawings, a packer generally available in the market is essentially composed a holder (1), a handle (2), a rotary fixation member (3) and a locking member (4). Wherein, a side panel (1a) is each provided to the holder (1) with a base plate (1b) guarded by both side panels (1a). A hole (1c) and a retaining gap (1d) are provided to each side panel (1a). The handle (2) is a plate with side frames (2a) pivoted to the holder (1) at where between both side panels (1a) to pivot in the holder (1). At the front end of each frame (2a) is provided with a retaining hole (2b); and an ear (2c) with a slide way (2d) is provided in the rear end of the frame (2a). The rotary fixation member (3) includes two circular turntables (3a) and two rotation shafts (3b). Both rotation shafts (3b) are disposed at where between said two ears (2c) extending from the frames (2a) of the handle (2) and are fixed to each of said two turntables (3a) with a hexagonal stub (3c) extending from the end of the rotary fixation member (3). As the turntable (3a) holds against the hole (1c) in the side panel (1a) of the holder (1), the handle (2) rotates with the rotation shaft (3b) as axial. The locking member (4) provided at the front end of the handle (2) is composed of a locking base (4a) and a spring (4b). A locking tongue (4c) is each provided at two ends of the locking base (4a) for the locking base (4a) to move in the retaining holes (2b) while the locking tongue (4c) are placed inside the retaining holes (2b) in the frame (2a). Furthermore, as illustrated in FIG. 3, the handle (2) engages and is secured to those two side panels (2a) by having both locking tongues (4c) to rest in the respective retaining gaps (1a) of the holder (1).

However, the prior art of a packer as described above has the following defectives:

(1) Too many elements including the hexagonal stub (3c) and the hexagonal hole in the turntable (3a) prevent easy process, and it is even more difficult to place the rotation shaft (3b) between two ears (2c) to allow the hexagonal stub (3c) to pass through the sliding way (2d) in the ear (2c) since the total length of the rotation shaft (3b) plus the hexagonal stub (3c) is greater than the width between two ears (2c) of the handle (2). Furthermore, both ears (2c) of the handle (2) are fixed in place to require higher production cost and prevent facilitated application of the packer.

(2) Poor Applicability. Once the handle (2) is coupled to both side panels (1a) of the holder (1), a certain length of the tape (5) winding around both rotation shafts (3b) indicates being overlapped. When such overlapped length gets too long, the outer tape (5) presses against the inner tape (5) to prevent the tail section of the tape (5) from being fastened any longer upon attempting further packing the tape (5) with the handle (2) and both side panels (1a) are coupled in fixed position.

(3) The locking member (4) fails to be fixed in position, instead, it is vulnerable to lateral movement, and thus to fall off. Such poor strength results in frequently damaging the packer.

(4) Not Handy. When the handle (2) is coupled to both side panels (1a) of the holder (1), the locking member (4) is concealed inside the handle (2) as illustrated in FIG. 3. It therefore prevents an easy release of the tape (5) since both locking tongues (4c) and the retaining gaps (1d) are in a position parallel with the holder (1). Furthermore, both of the tape (5) in its tightened state and all the components can be easily jammed to frustrate the user of the packer.

SUMMARY OF THE INVENTION

The primary purpose of the present invention is to provide an improved structure of a packer characterized by reduced number of elements, easy assembly and production cost reduction.

Another purpose of the present invention is to provide an improved structure of a packer characterized by that upon fixing a tape by both side panels of a holder engaged with a handler, the tail section of the tape is also fastened to achieve better practical application.

Another purpose yet of the present invention is to provide an improved structure of a packer characterized by significantly reducing damage to the packer. To achieve the purpose, a locking member with a higher structural strength to secure positioning without concerns over falling off due to lateral slide is provided.

Another purpose yet of the present invention is to provide an improved structure of a packer characterized by allowing easier operation. To achieve the purpose, the locking member is partially exposed from the handler to forthwith indicate opening status by having the tail section of the tape to press against the locking member.

DETAILED DESCRIPTION OF THE PREFERRED EMBODIMENTS

Figure 1:
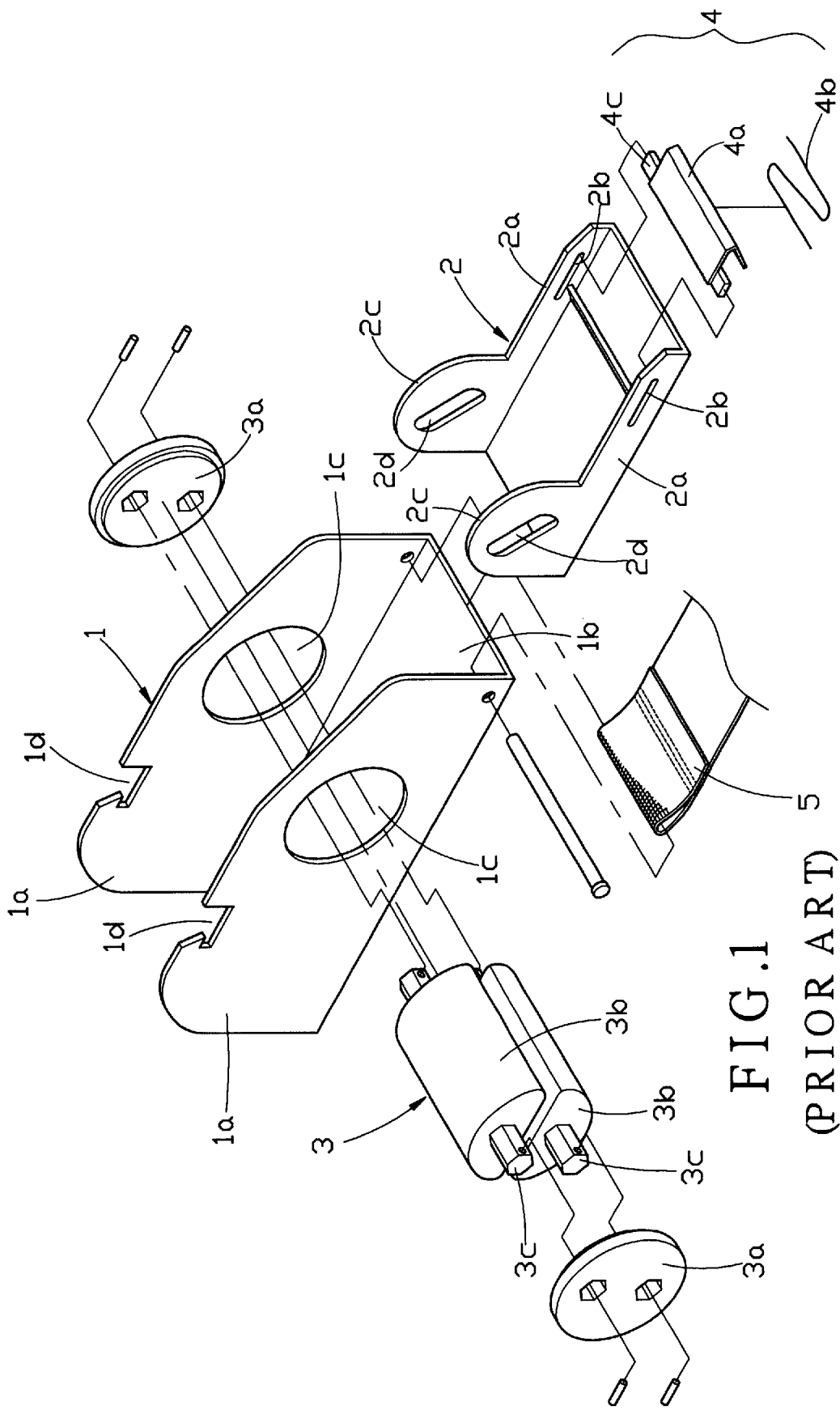
FIG. 1 is an exploded view of a prior art.
Figure 2:
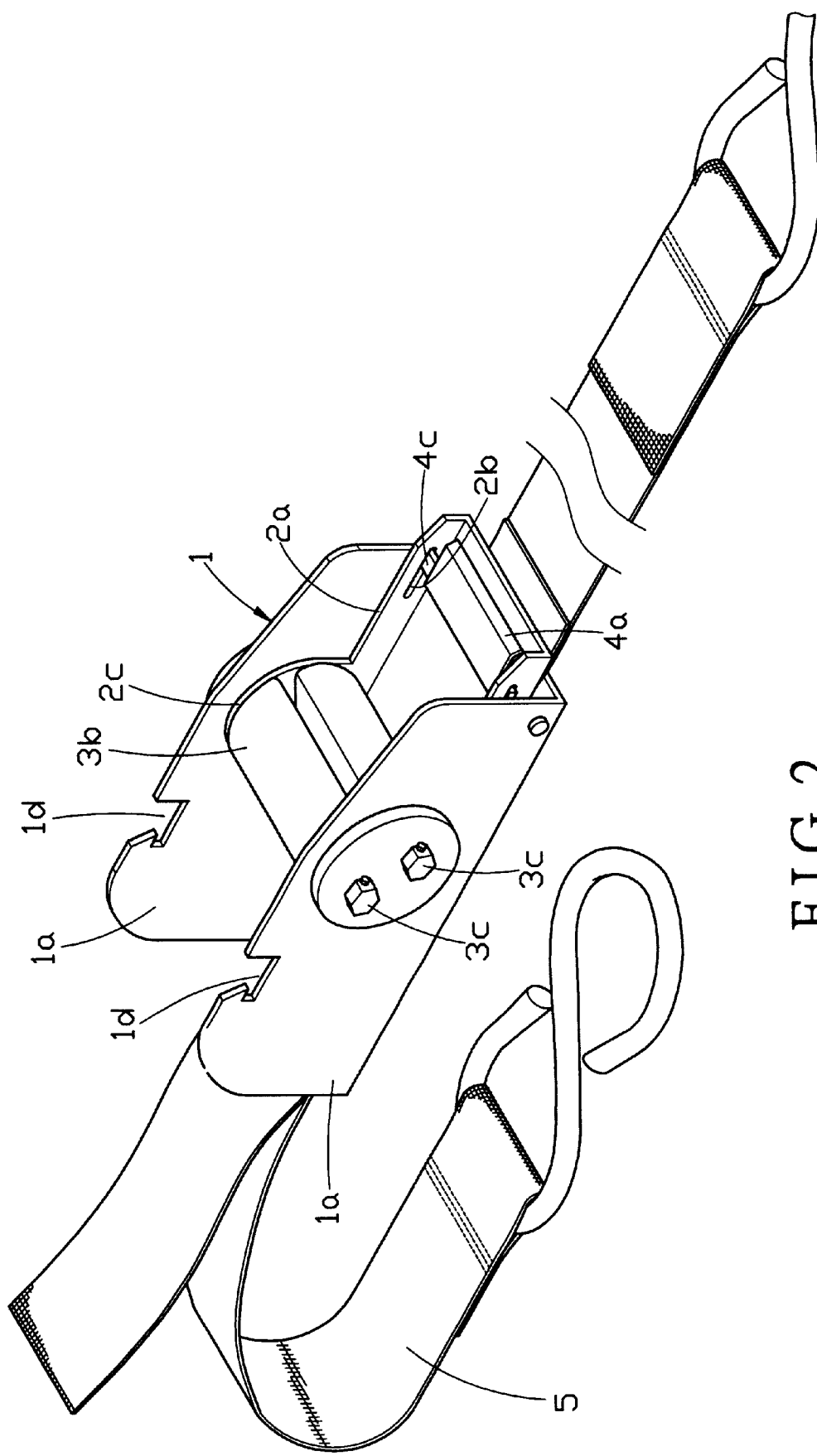
FIG. 2 is a perspective view of an assembly of the prior art.
Figure 3:
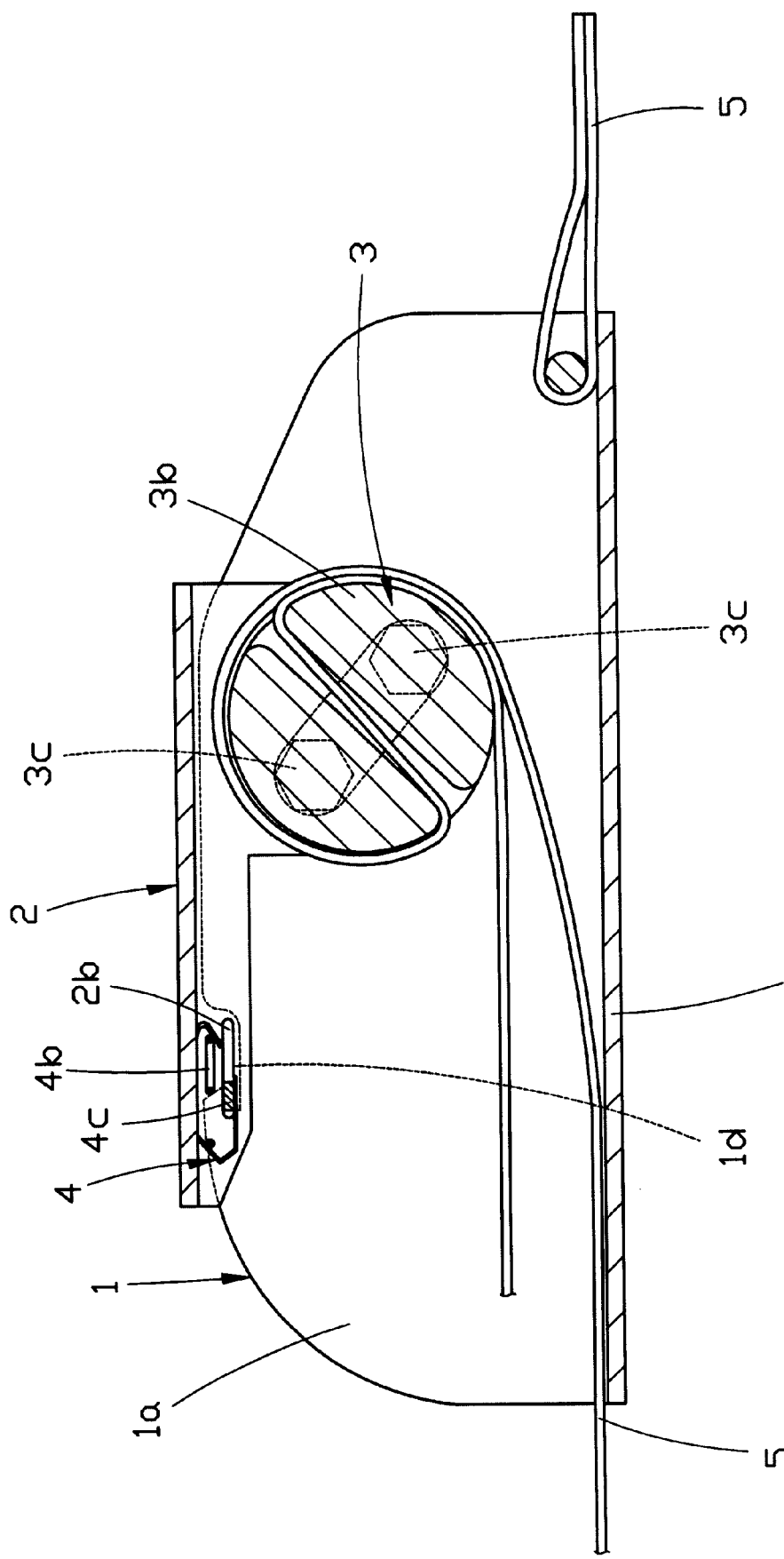
FIG. 3 is a sectional view of a mechanism of the prior art to hold a binding band in position.
Figure 4:
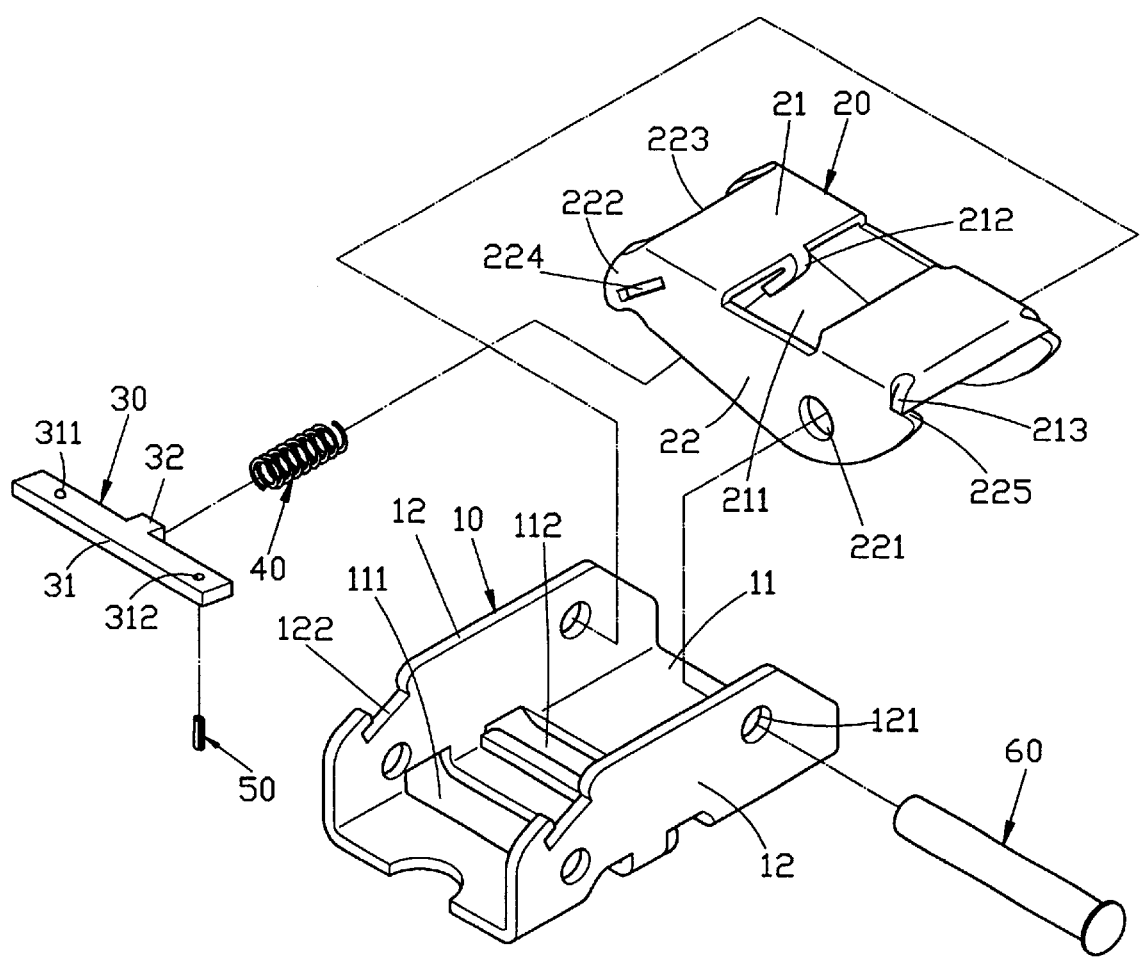
FIG. 4 is an exploded view of a preferred embodiment of the present invention.

Referring to FIG. 4, a preferred embodiment of the present invention comprises a holder (10), a handle (20), a locking member (30), a spring (40), a pin (SO) and a pivot (60).

The holder (10) comprises a base plate (11) guarded by two side panels (12). Two hollows (111, 112) are provided in the middle section of the base plate (11). Both side panels (12) are each provided with a hole (121) in the rear end. A tilting retaining gap (122) is provided on the upper edge of the front portion of each side panel (12).

The handle (20) comprises a seat (21) with its both sides respectively extending a side plate (22) and a hollow (211) provided in the middle section of the seat (21). A latch (212) bends inwardly from the front edge of the hollow (211 1and a pivoting hole (221) is each provided in the end of each side plate (22). A locking ear (222) each extends from the front edge of each side plate (22) with a gap (223) formed between two locking ears (222). A through hole (224) corresponding to the tilt of the retaining gap (122) is each provided on the locking ear (222). Furthermore, a gradation edge (225) is disposed at the rear end of each side plate (22). A reinforcement rib (213) abutted to the upper end of the gradation edge (225) bends downward from the rear end of the seat (21).

The locking member (30) is a rectangular member (31) having at its middle section extending an engagement bit (32), a positioning nipple (311) at one end and a pinhole (312) on the other end.

The spring (40) relates to one generally available in the market; the pin (50), to a spring pin and a pivot (60), a stud.

Figure 5:
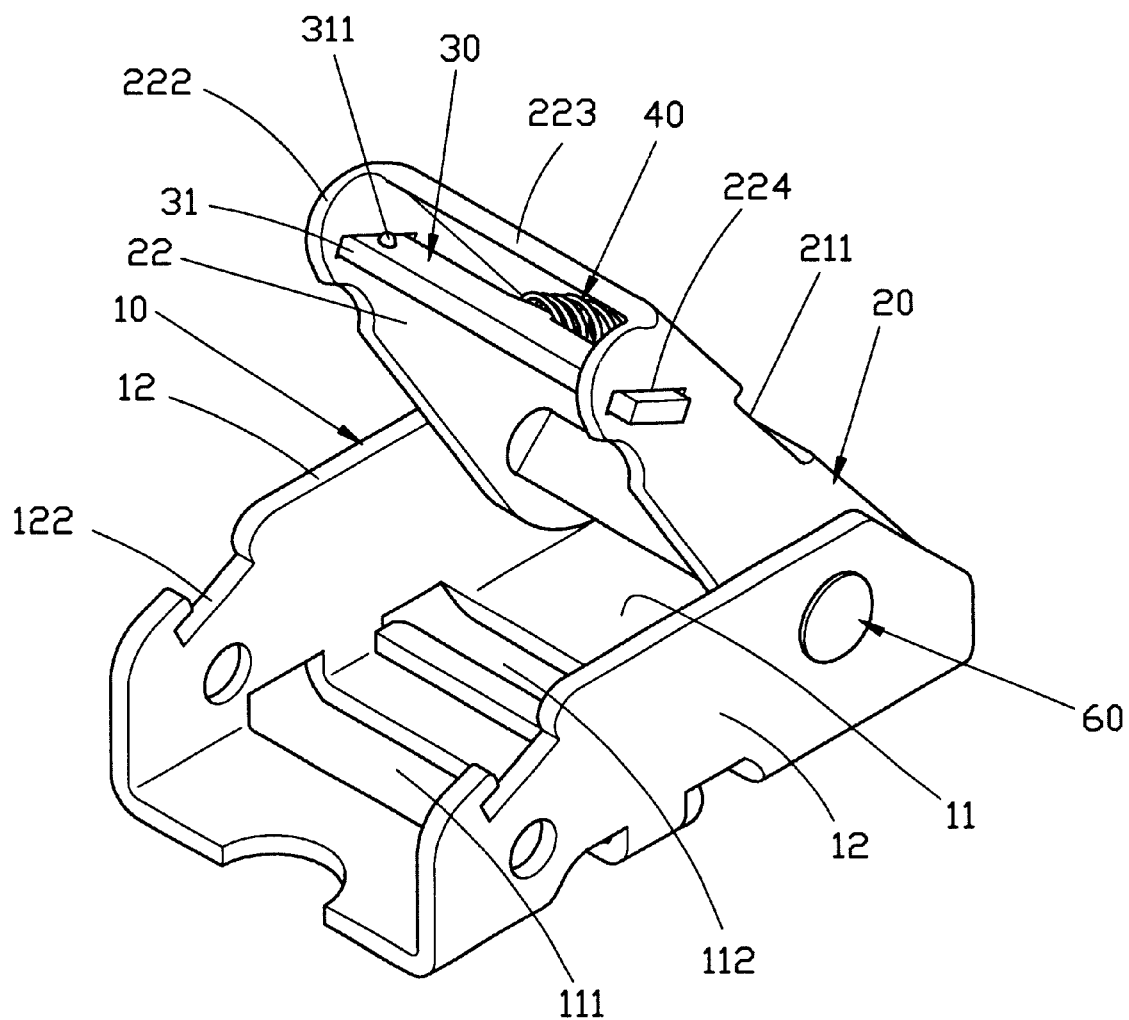
FIG. 5 is a perspective view of an assembly of the preferred embodiment of the present invention.

When assembled as illustrated in FIG. 5, one end of the spring (40) is inserted into the latch (212) and the end of the locking member (30) provided with the pinhole (312) is inserted at an inclination inside out to pass the through hole (224) of the side plate (22) of the handle (20). Meanwhile, the other end of the spring (40) is inserted to the engagement bit (32) of the locking member (30). Then the other end of the locking member (30) is inserted inside out to the through hole (224) of another side plate (22) of the handle (20). The pin (50) is then inserted to the pinhole (312) of the locking member (30) for the pin (50) to be partially exposed from the pinhole (312) and for the locking member (30) is positioned between two through holes (224) of the handle (20) by means of the positioning nipple (311) and the pin (50). Finally, the rear end of the handle (20) is inserted into where between both side panels (12) of the holder (10) and the pivot (60) is inserted into the holes (121 ) at the rear ends of both side panels (12) of the holder (10) and the pivoting holes (221) off both side plates (22) of the handle (20) to pivot both of the holder (10) and the handle (20).

Figure 6:
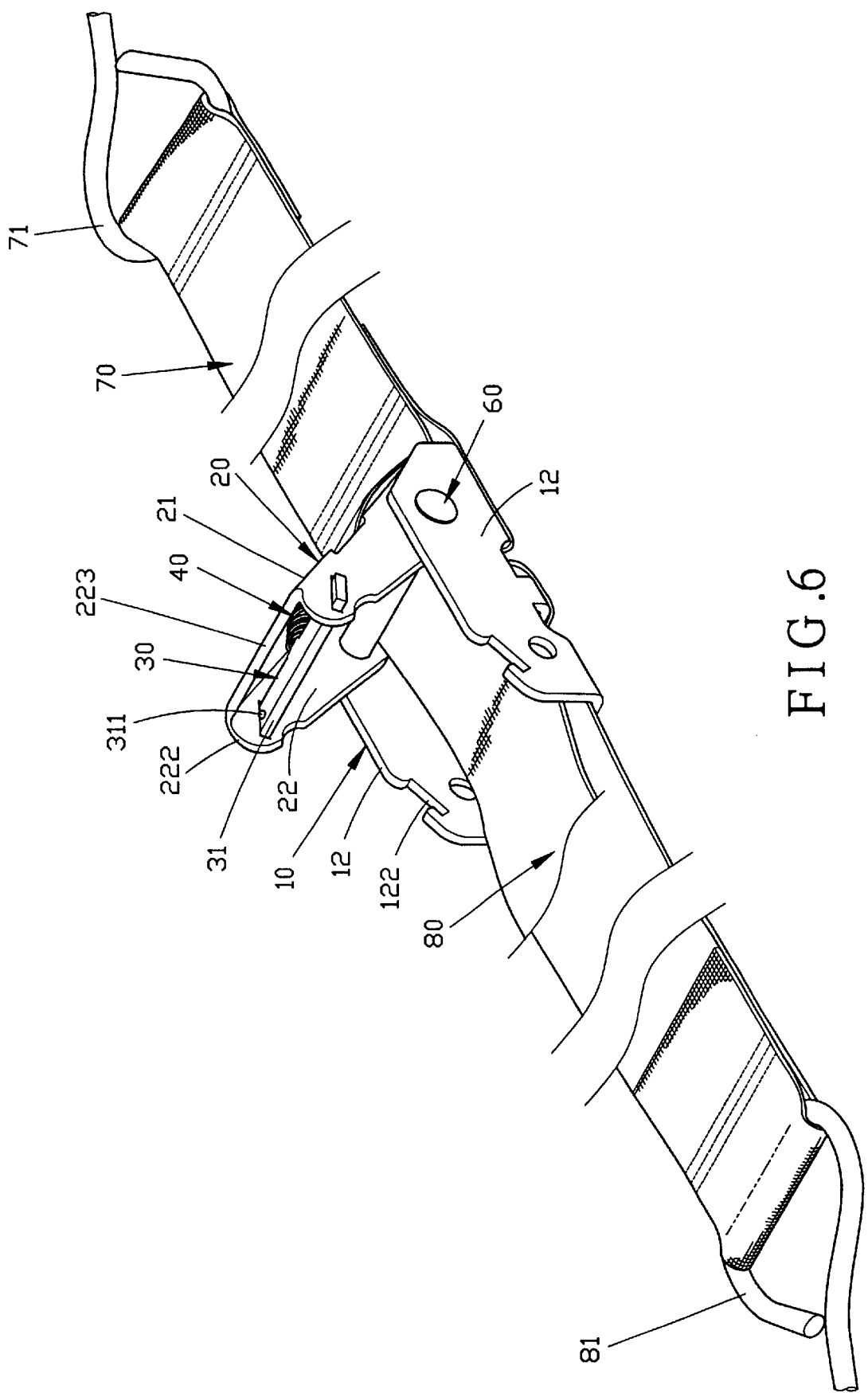
FIG. 6 is a perspective view of the preferred embodiment adapted with a binding band.
Figure 7:
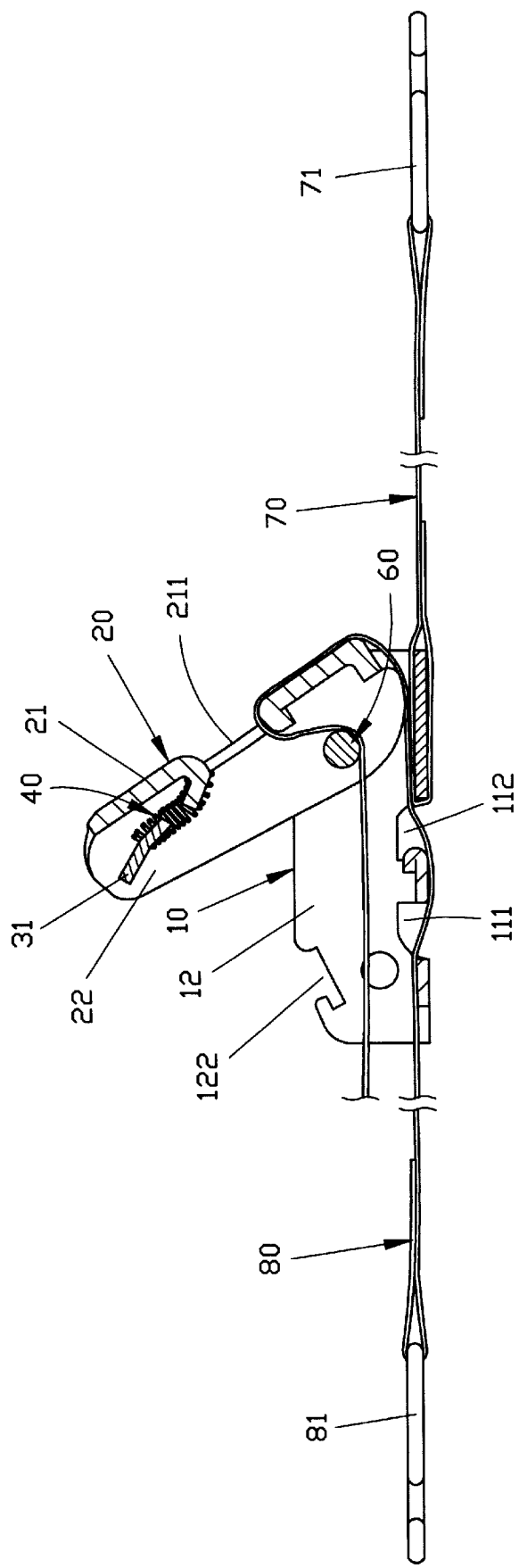
FIG. 7 is a sectional view showing a mechanism of the preferred embodiment to hold binding band in position.
Figure 8:
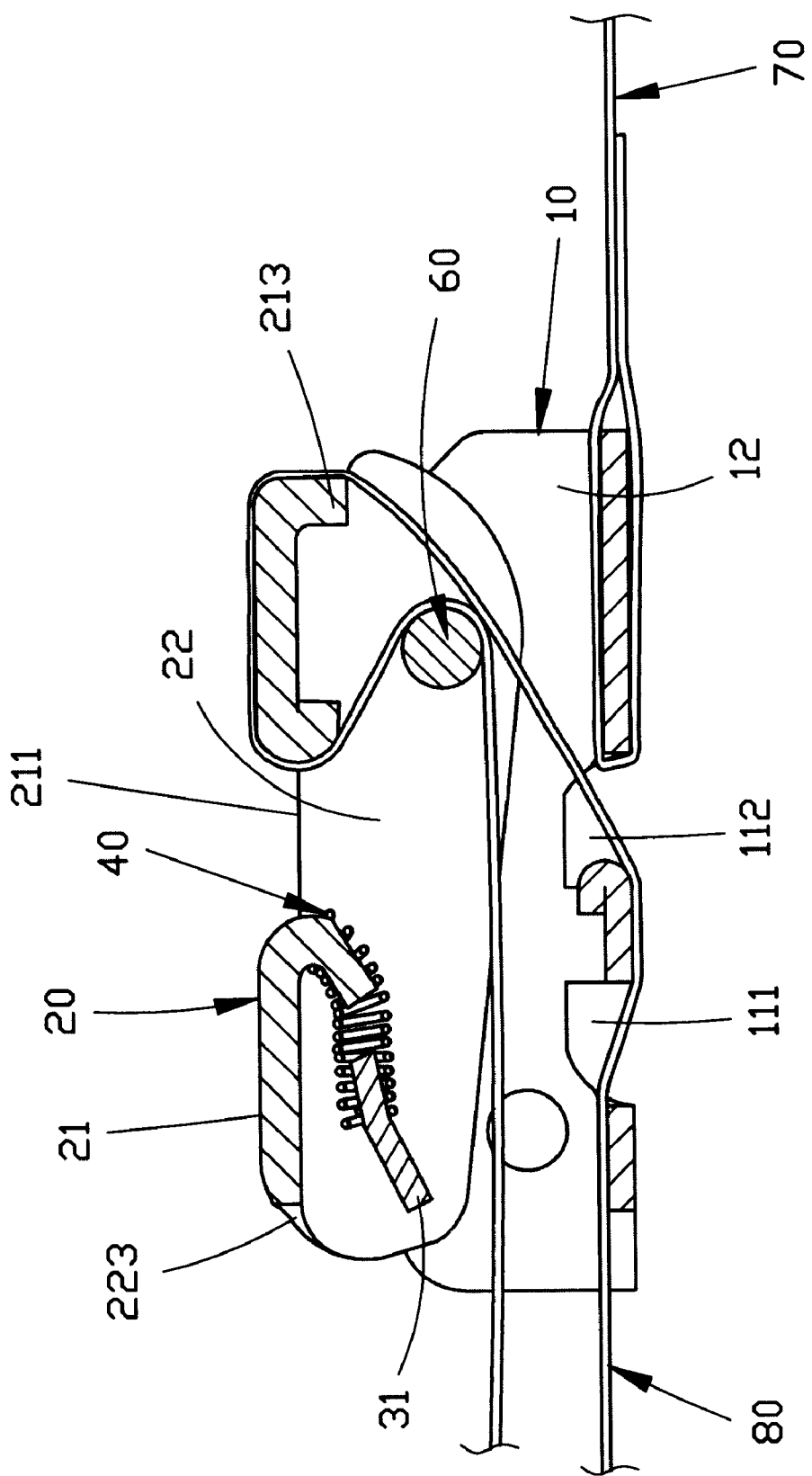
FIG. 8 is another sectional view showing the mechanism of the preferred embodiment to hold binding band in position.

Now referring to FIGS. 6 and 7, a tape (70) having its one end fixed by means of a loop (71) and another end passing through the hollow (112) in the rear of the holder (10) and folded in reverse before being sawn in position. Another tape (80) with its one end fixed by means of another loop (81) and another end passing inside out from the hollow (111) in the front end of the holder (10), then entering into the hollow (112) in the rear of the holder (10) and to the rear end of the handle (20) before being bended in reverse to pass through the hollow (211) in the handle (20), winding forwardly around the pivot (60) and further to leave from the front of the holder (10). As illustrated in FIG. 8, upon packing an article, both loops (71, 81) respectively leading both tapes (70, 80) are buckled at a predetermined locations. Then force is applied to pull tight the tail section of the tape (80) for both tapes (70, 80) to tightly fasten the article. Then push the front end of the handle (20) towards the holder (10) to allow both ends of the locking member (30) incorporated to the handle (20) are held in position by taking advantage of expansion flexibility from the spring (4) to hold against in the retaining gap (122) provided on the upper edge of the front end of each side panels (12) of the holder (10). Meanwhile, the tape (80) is subject to bending and compression status by the hollows (111, 112) of the holder (10) in conjunction with the hollow (211) and the reinforcement rib (213) of the handle (20) so to yield the tape (80) the tension sufficiently to have the tape (80) to be firmly secured in the packer to complete the packing operation. Furthermore, the packing effect is further improved by continuing to push the tail section of the tape (80) if and when required.

Figure 9:
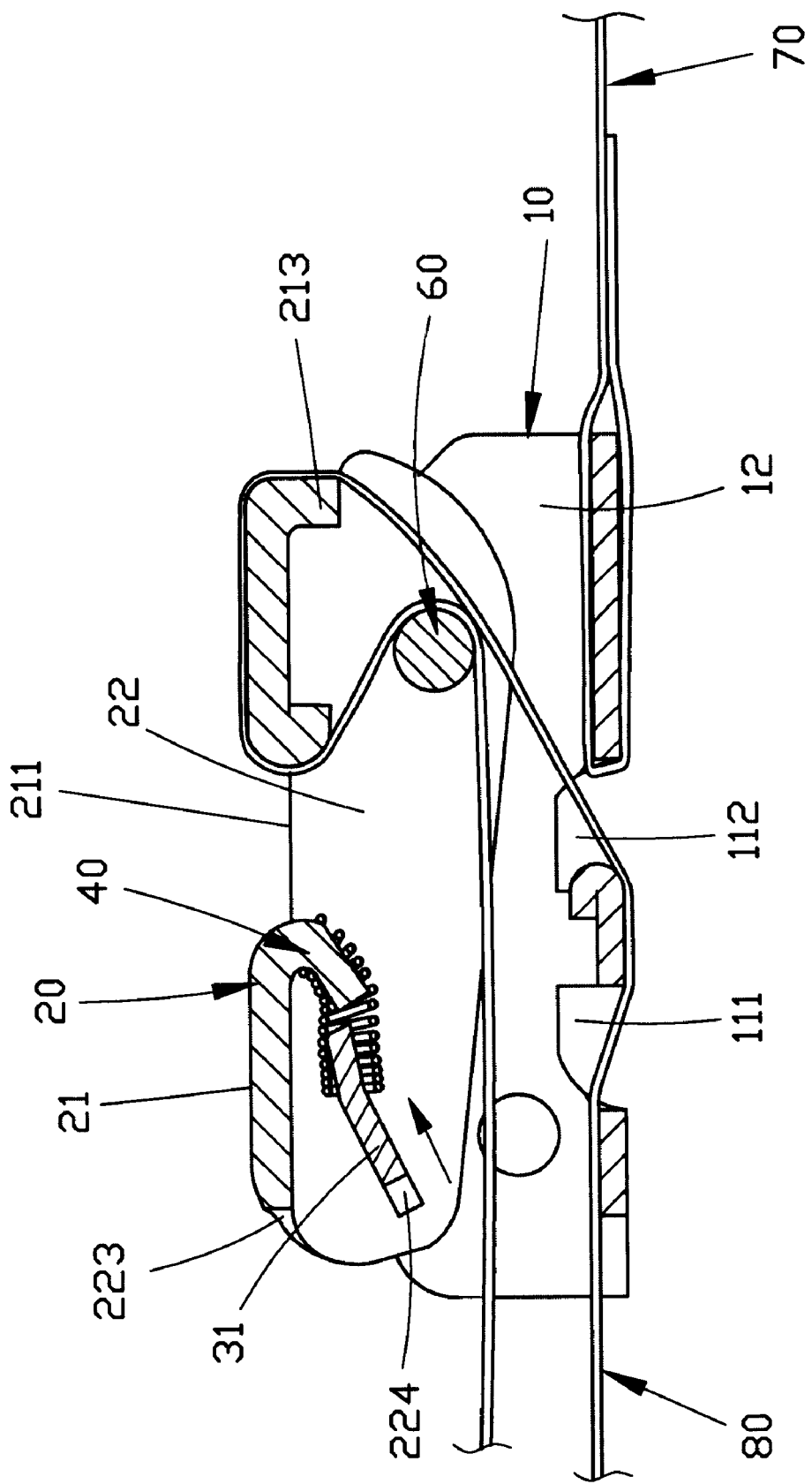
FIG. 9 is a schematic view showing that a locking member of the preferred embodiment is released.
Figure 10:
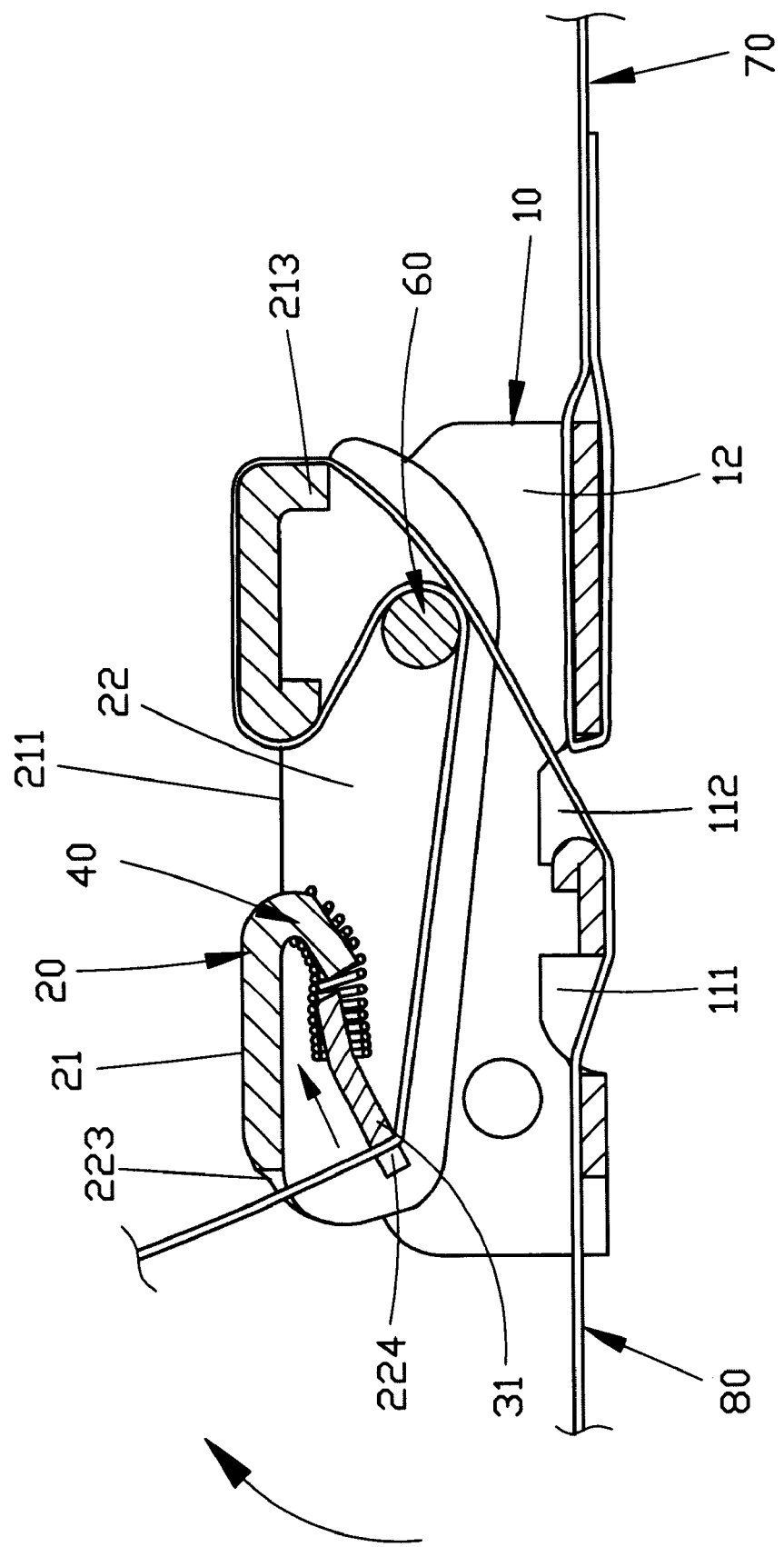
FIG. 10 is another schematic view showing that the locking member of the preferred embodiment is released.

As illustrated in FIGS. 9 and 10, additional to forthwith push backward the locking member (30), the tape (80) can be also released by taking advantage of the gap (223) between two locking ears (222) of the handle (20) to rise up its tale section for the tape (80) to conveniently push back the locking member (30) along the inclination formed between the retaining gaps (122) and the through holes (224), thus to compress the spring (40) while both ends of the locking member (30) are disengaged from the retaining gaps (122) to open up the handle (20) and the tape (80) can be easily released.

The present invention has the following benefits:

(1) Less members required and easier assembly to reduce production cost;

(2) By having the handle (20) to be buckled to both side panels (12) of the holder (10), there is only one small portion of the tape (80) winding upon the holder (10), the handle (20) and the pivot (60) that is stay flushed so to allow further fastening of the tail section of the tape (80) to achieve better applicability;

(3) The locking member (30) yields high structural strength, and can be further firmly secured in position by means of the positioning nipple (311) and the pin (50) to eliminate possible lateral slide to significantly reduce the damage to the packer; and (4) Upon fixing the tape (80), the locking member (30) is partially exposed from the handle (20) to allow easy push by one's finger and the locking member (30) can also be opened by having the tail section of the tape (80) to push against the locking member (30), thus to offer better convenience in use.

I claim:

1. A packer structure comprising a holder, a handle, a locking member, a spring, a pin and a pivot; the holder including a base plate having two side panels each having a rear end formed with a hole; the handle including a seat having two side plates each having a rear end formed with a pivoting hole, the two side plates of the handle being inserted between the two side panels of the holder; the pivot being inserted through the hole of each of the two side panels of the holder and the pivoting hole of each of the two side plates of the handle; wherein:

the holder including two hollows formed in the base plate, and a tilting retaining gap formed in an upper edge of a front end of each side panel;

the handle including a locking ear with a hole extending from a front edge of each side plate; a gap being defined between both locking ears; a hollow being formed in a middle section of the seat of the handle; and a latch being bent inward from a front end of the hollow;

the locking member being a rectangular member having a middle section formed with a bit, a first end formed with a positioning nipple and a second end formed with a pinhole; and both ends of the locking member being respectively passed through the holes of the locking ears of the handle; both ends of the spring being respectively disposed in the latch of the handle and the bit of the locking member; the pin being inserted in the pinhole of the locking member to hold it in position by the positioning nipple and the pin.

2. The packer structure as claimed in claim 1, wherein, a gradation edge is formed on the rear end of each side plate of the handle and a reinforcement rib is bent vertically from a rear end of the seat of the handle and is abutted on an upper end of the gradation edge.

\* \* \* \* \*